United States Patent [19]

DeVries

[11] Patent Number: 4,858,769
[45] Date of Patent: Aug. 22, 1989

[54] FLOTATION SEPARATOR

[76] Inventor: Jeffrey S. DeVries, 13530 Tyler St., Holland, Mich. 49424

[21] Appl. No.: 864,338

[22] Filed: May 19, 1986

[51] Int. Cl.⁴ ............................................. B07C 5/02
[52] U.S. Cl. .................................... 209/3.1; 209/172; 209/173; 210/526; 198/550.13; 134/131
[58] Field of Search ...................... 209/172, 172.5, 173, 209/509, 645, 3.1; 210/526; 134/124, 131; 198/550.13

[56] References Cited

U.S. PATENT DOCUMENTS

| 964,290 | 7/1910 | Maanum | 209/173 |
| 2,489,161 | 11/1949 | Scholes | 209/173 |
| 4,225,424 | 9/1980 | Patzlaff | 209/645 X |
| 4,750,995 | 6/1988 | Fogerson | 209/173 |

Primary Examiner—Andres Kashnikow
Assistant Examiner—Patrick N. Burkhart
Attorney, Agent, or Firm—Waters, Morse & Harrington

[57] ABSTRACT

A flotation separator has a tank normally partially filled with a liquid, and an endless conveyor belt with upper and lower courses extending from a lower portion in the tank to a higher discharge position exterior to the tank. A shroud isolates the lower course of the belt from the upper course within the liquid, and from the primary circulation in the tank.

10 Claims, 3 Drawing Sheets

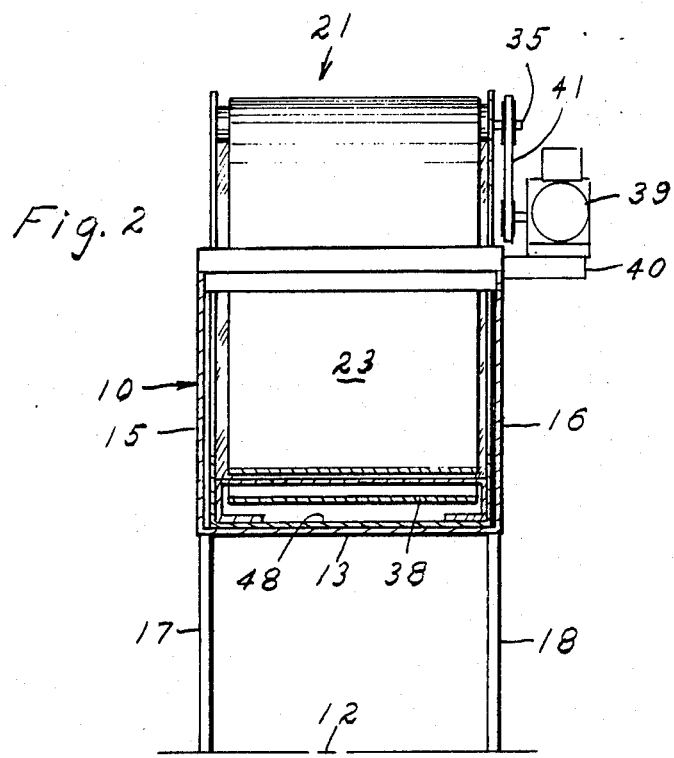
Fig. 2
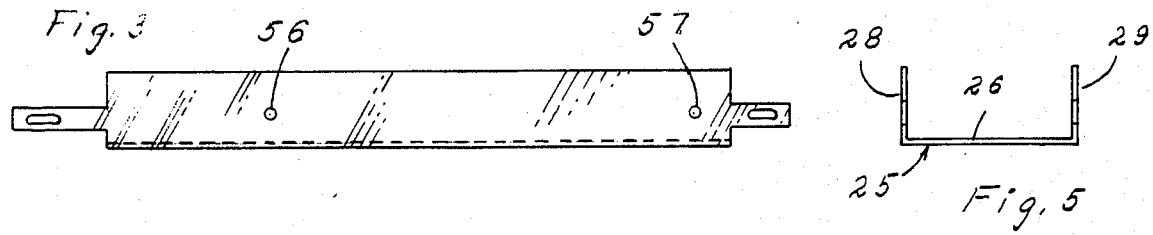
Fig. 3
Fig. 5
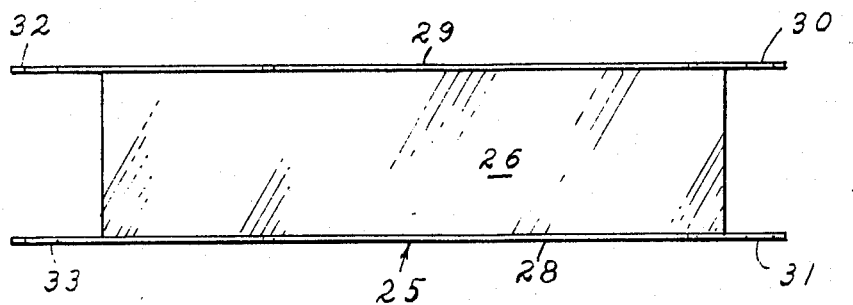
Fig. 4

FLOTATION SEPARATOR

BACKGROUND OF THE INVENTION

Separation of groups of discrete particles based upon a differences in buoyancy can be accomplished by the use of a flotation tank. The tank is filled with a liquid selected so that one group of particles will sink toward the bottom, while the other rises to the surface. Suitable conveying equipment is then provided to remove the heavier particles, and those that rise to the surface can be removed by similar equipment, or by a hand skimming operation. This technique has been used very successfully in agricultural applications, particularly in the separation of a mixed mass of blueberries so that the ripe ones can be accumulated separately, and the green ones discarded. The ripe ones have a greater specific gravity, and proceed toward the bottom of the tank, where they are picked up by an inclined conveyor. Tanks for this purpose tend to be triangular in side elevation, with the conveyor supported on the inclined bottom of the tank. The mixed mass of berries is dumped into the tank above the deepest point, which is also above the lower extremity of the conveyor. The active number of the conveyor is an endless belt driven so that the upper course of the belt moves upwardly to carry the ripe blueberries that have settled toward the bottom.

The movement of the upper course of the belt through the liquid tends to generate a circulation within the liquid that proceeds from the upper end of the conveyor back across the surface of the liquid, and downward toward the lower extremity of the conveyor. This primary circulation is often augmented by sprays of the liquid directed downward into the tank from above this position. Forcing the berries downward into the liquid has the desirable effect of increasing the velocity of the movement of the ripe berries downward to the point where they can be deposited on the upper course of the conveyor. The lighter weight green berries can then separate from the mass as the conveyor belt moves the accumulated collection on the inclined path upward toward the surface. Where the buoyancy differential is substantial, the green berries will begin to move toward the surface immediately without closely approaching the conveyor.

A problem with this type of device has been in the effect of the movement of the lower course of the conveyor at a downward incline through the liquid, tending to drag some of the liquid along with it to produce a counter-circulation to the primary circulation described above. This obviously tends to produce a random turbulence that interferes with the desired movement of the berries. Where the buoyancy differential is minimal, this turbulence can easily seriously impair the ability the machine to produce a sorting operation at a satisfactory rate of production. The present invention is directed to this problem.

SUMMARY OF THE INVENTION

A flotation separator has an endless belt conveyor extending downward at a incline into a tank containing a liquid, with the upper course of the belt positioned to receive objects that sink toward the bottom. The lower course of the belt is isolated from the primary circulation of liquid in the tank induced by the movement of the upper course.

DESCRIPTION OF THE DRAWINGS

FIG. 2 is a section on the plane 2—2 of FIG. 1.

FIG. 3 is a side elevation of the frame of the conveyor.

FIG. 4 is a plan view of the frame of the conveyor.

FIG. 5 is an end view of the frame of the conveyor.

DESCRIPTION OF THE PREFERRED EMBODIMENT

Figure 1:
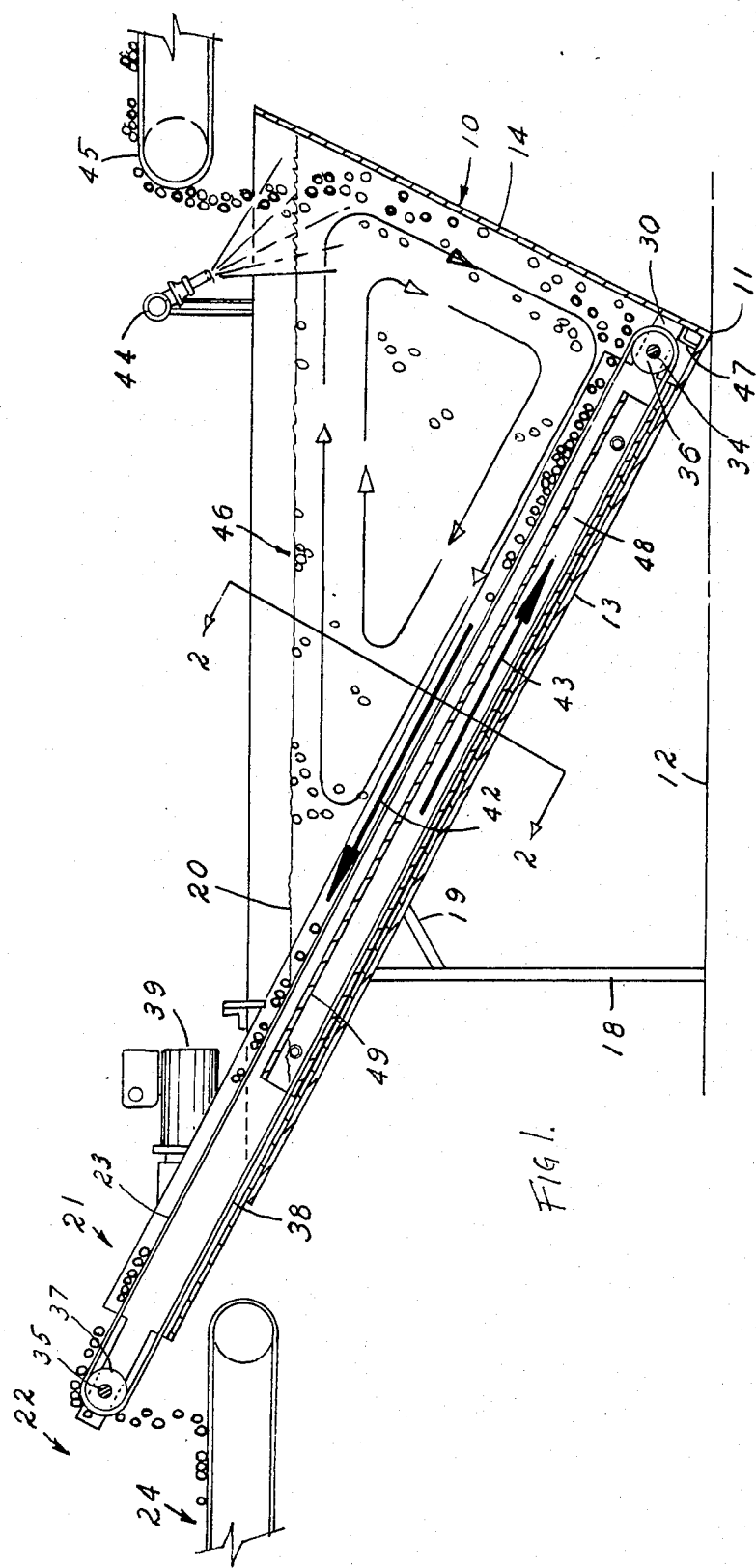
FIG. 1 is a sectional side elevation showing a flotation separator embodying the present invention.

The machine illustrated in FIGS. 1 and 2 is based upon a tank indicated generally at 10, which is triangular in cross section, with the apex 11 resting on the floor 12. The inclined bottom of the tank is indicated at 13, and the end of the tank at 14. The sides 15 and 16 are parallel. The legs 17 and 18 maintain the position of the tank, with the diagonals 19 added to increase the stability of the legs. The tank is filled with a liquid to a normal level indicated at 20. Where the machine is to be used for separating ripe from green blueberries, the liquid in the tank can be water. An endless-belt conveyor generally indicated at 21 rests on the inclined bottom 13 of the tank, and extends from a position close to the deepest part of the tank to a discharge position 22 exterior to the tank. Berries carried by the upper course 23 of the endless conveyor belt are dropped onto the receiving conveyor 24 for movement to a packing station.

The construction of the conveyor centers in the frame 25 shown in FIGS. 3, 4, and 5. This member is essentially channel-shaped in cross section, with the central panel 26 and the sides 28 and 29. The sides have extensions as shown at 30–33 providing brackets for receiving the shafts 34 and 35 carrying the rollers 36 and 37 that position the endless-belt so that the upper course 23 and the lower course 38 are as shown in FIG. 2. The conveyor belt is driven by the gear motor 39 mounted on the bracket 40 welded to the side 16 of the tank. Power is delivered to the conveyor through the belt 41 and appropriate pulleys mounted on the gear motor 39 and the conveyor shaft 35, as shown in FIG. 2. The operation of the gear motor establishes an upward movement of the upper course of the conveyor 23, as indicated by the arrow 42 in FIG. 1. The corresponding movement of the lower course is indicated by the arrow 43. The upwardly-inclined movement of the upper course 23 tends to pull along the adjacent portion of the liquid within the tank to produce a circulation in the general pattern shown in FIG. 1. This circulation is usually augmented by the provision of spray jets as shown at 44 directed downwardly into the tank above the deep end. The assortment of berries carried by the feed conveyor 45 is dropped into the tank at this point, with the result that the tank circulation tends to carry these berries down into the liquid. The process of separation by differential buoyancy begins immediately, with the riper berries moving toward the bottom where they are received by the upper course 23 of the conveyor. The lighter weight green berries move toward the surface, where they accumulate as shown at 46. The low end of the conveyor is positioned closely adjacent to the end 14 of the tank as a result of the functioning of the extensions 30 and 31 as abutments limiting the extent to which the entire conveyor assembly can slide down the inclined bottom 13 of the tank. The position of these extensions is also selected to avoid interference with the reinforcement 47 welded to the end and bottom of the tank at the apex 11.

Figure 6:
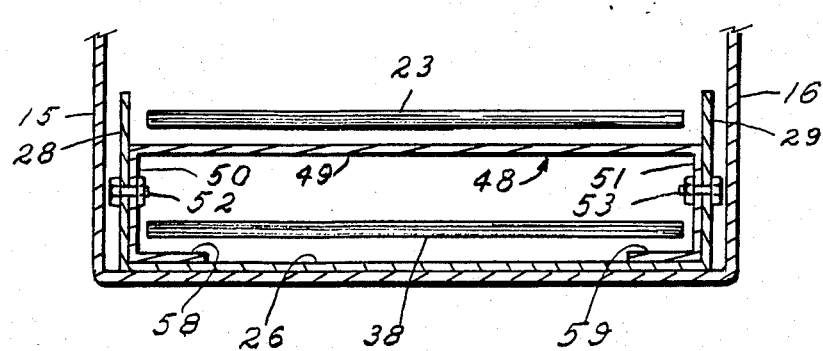
FIG. 6 is a sectional view of the conveyor, or an enlarged scale.
Figure 7:
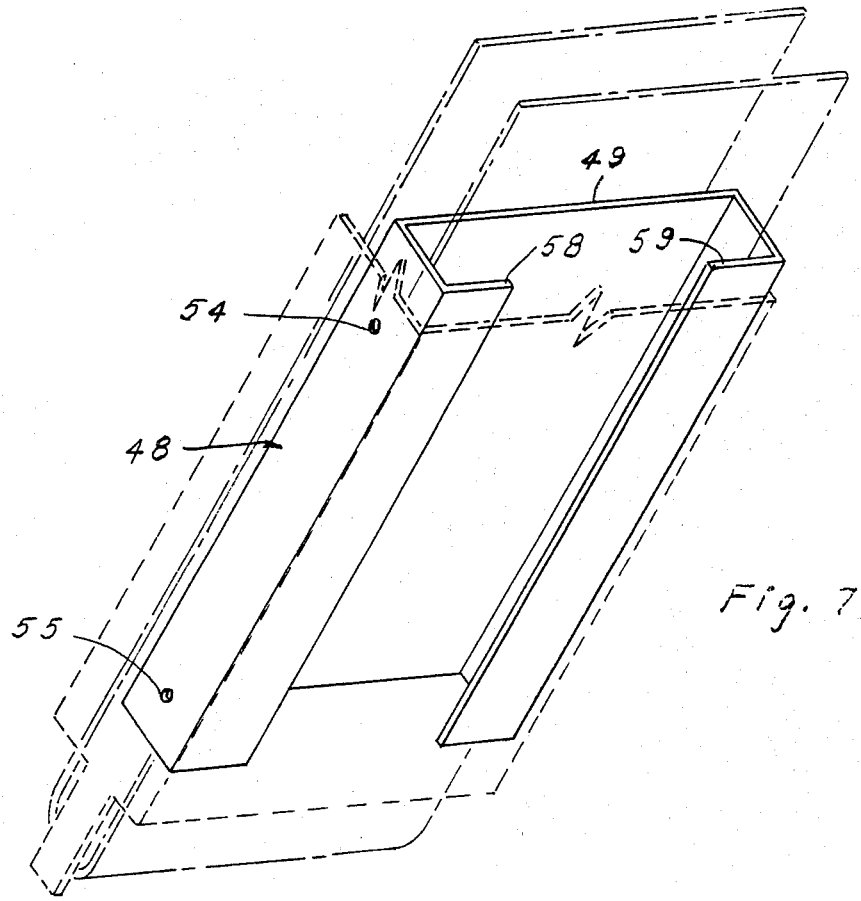
FIG. 7 is a perspective view of the isolating shroud, showing its relationship to the operating components of the conveyor.

This invention is directed primarily at the removal of the effect of the movement of the lower course 38 of the conveyor through the liquid. Unless preventive measures are taken, this movement tends to produce a circulation opposite to that shown by the arrows in FIG. 1, and would thus inhibit the desired movement of the blueberries. This undesirable counter-circulation is prevented by the presence of the shroud 48. The shroud 48 is best shown in FIGS. 6 and 7. The central panel 49 is interposed between the upper course 23 and lower course 38 of the conveyor belt, and the sides 50 and 51 are secured to the sides 28 and 29 of the conveyor frame by bolts and nuts as shown at 52 and 53 in FIG. 6. These fastenings traverse holes as shown at 54 and 55 in FIG. 7, and at 56 and 57 in FIG. 3. The flanges 58 and 59 rest against the central panel 26 of the conveyor frame 25.

The presence of the panel 49 between the up-moving and the down-moving course of the conveyor belt surrounds the down-moving lower course, and provides a tunnel isolating the liquid in contact with the lower course. This prevents the lower course from generating a circulation counter to that shown in FIG. 1. The shroud extends to the surface, and thus the belt cannot draw liquid in at the upper end. The lower course can therefore only generate a small local turbulence that is not communicated to the rest of the contents of the tank. Berries that are initially entrained in the water by the jet system 44 and the circulation induced by the upper course 23 are thus not disturbed in this movement by a pattern of counter circulation.

The embodiments of the present invention in which an exclusive property or privilege is claimed are defined as follows:

1. A liquid flotation tank for sorting objects by flotation on a liquid comprising:

an elongated tank having a triangular cross sectional configuration, with an inclined bottom extending downwardly and inwardly from one side of the tank and an end extending downwardly from the opposite side of the tank, the end and the bottom meeting at an apex at the lowest point of the tank, the sides of the tank being enclosed by sidewalls, the end and bottom extending upwardly above the liquid level in the tank, the upper portion of the end serving as an entry point for objects in the tank, the upper portion of the bottom serving as an exit point for heavier sorted objects;

a conveyor having an endless loop conveyor belt mounted inside the tank and extending generally parallel to the bottom from a lower end adjacent the apex of the tank to an upper end extending to a discharge point above the liquid level in the tank, the conveyor having an upwardly moving upper course, and a downwardly moving lower course, both positioned in the tank above the bottom; and shroud means positioned between the upper and lower courses of the conveyor for isolating the upper course from the lower course as they move through the liquid, such isolation enhancing the settling of objects on the upper course for conveyance out of the tank.

2. A liquid flotation tank according to claim 1 wherein the shroud comprises a panel extending substantially the length of the liquid submerged portion of the conveyor between the upper and lower courses.

3. A liquid flotation tank according to claim 2 wherein the shroud is mounted in the tank by sides that extend downwardly from the panel on the outer sides of the lower course to a position adjacent the bottom of the tank, the shroud forming a tunnel through which the lower course passes.

4. A liquid flotation tank accordingly to claim 3 wherein the shroud has an upper end that extends above the liquid level in the tank.

5. A liquid flotation tank according to claim 1 wherein the objects are blueberries and the liquid is water, the tank comprising a flotation tank for separating the ripe berries from the unripe berries, the ripe berries sinking to the conveyor.

6. A liquid flotation tank according to claim 5 and further comprising spray means directed downwardly on the berries at the entry point in the tank, the spray means enhancing separation of the berries.

7. In sorting apparatus for blueberries and the like wherein ripe and unripe blueberries are introduced at an inlet end of a water filled tank, with the ripe blueberries settling toward the bottom of the tank and the unripe blueberries floating on the water, the ripe blueberries being conveyed from the tank by an upwardly inclined endless belt conveyor positioned in the tank and leading from a lower end adjacent the inlet end of the tank to an upper end position above the water at an outlet end of the tank, the belt conveyor having an upper course that travels upwardly from the lower to the upper end and carried blueberries out of the tank, the belt having a lower course positioned in the tank below the upper course and traveling from the upper to the lower end of the conveyor, the improvement wherein the apparatus includes a shroud positioned between the lower course and the upper course of the conveyor in the underwater portion of the conveyor path, the shroud serving to isolate the lower course at a position where ripe blueberries are supposed to settle on the upper course, the shroud serving to enhance blueberry settling on the upper course.

8. Sorting apparatus according to claim 7 wherein the shroud comprised a top plate extending over the top of the lower course of the conveyor and sidewalls extending downwardly from the plate over the sides of the lower course.

9. Sorting apparatus according to claim 7 wherein the shroud comprises an elongated plate positioned between and separating the upper and lower courses of the conveyor, the plate being mounted by removable fasteners in the tank such that the shroud can be removed to remove or service the conveyor or the tank.

10. Sorting apparatus according to claim 9 wherein the shroud plate extends to opposite sidewalls of the tank and is fastened thereto.

* * * * *